United States Patent
Chaudhari et al.

(10) Patent No.: US 8,171,345 B2
(45) Date of Patent: May 1, 2012

(54) DISABLEMENT OF AN EXCEPTION GENERATING OPERATION OF A CLIENT SYSTEM

(75) Inventors: Ajay Chaudhari, Bangalore (IN); Laxmisha Nagaraj, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 331 days.

(21) Appl. No.: 12/424,045

(22) Filed: Apr. 15, 2009

(65) Prior Publication Data

US 2010/0268993 A1 Oct. 21, 2010

(51) Int. Cl.
*G06F 11/00* (2006.01)

(52) U.S. Cl. .............................. 714/38.1; 714/39; 714/49

(58) Field of Classification Search ................. 714/38.1, 714/39, 49
See application file for complete search history.

(56) References Cited

U.S. PATENT DOCUMENTS

| | | | | |
|---|---|---|---|---|
| 5,974,249 A | * | 10/1999 | Elliott et al. | 703/27 |
| 6,701,454 B1 | * | 3/2004 | Fischer et al. | 714/15 |
| 7,617,418 B2 | * | 11/2009 | Snyder et al. | 714/38.14 |
| 2003/0145253 A1 | * | 7/2003 | de Bonet | 714/38 |
| 2004/0186858 A1 | * | 9/2004 | McGovern et al. | 707/200 |
| 2006/0070037 A1 | * | 3/2006 | Canning et al. | 717/127 |
| 2006/0195493 A1 | * | 8/2006 | Chang et al. | 707/204 |
| 2006/0259542 A1 | * | 11/2006 | Wu et al. | 709/202 |
| 2007/0130231 A1 | * | 6/2007 | Brown et al. | 707/204 |
| 2007/0130597 A1 | * | 6/2007 | Parker et al. | 725/94 |
| 2007/0192373 A1 | * | 8/2007 | Lomet | 707/200 |
| 2007/0226438 A1 | * | 9/2007 | Erofeev | 711/162 |
| 2008/0126747 A1 | * | 5/2008 | Griffen et al. | 712/25 |
| 2008/0133639 A1 | * | 6/2008 | Panasyuk et al. | 709/201 |
| 2010/0095265 A1 | * | 4/2010 | Ewing et al. | 717/100 |
| 2010/0131742 A1 | * | 5/2010 | Col et al. | 712/220 |

* cited by examiner

*Primary Examiner* — Scott Baderman
*Assistant Examiner* — Loan L. T. Truong

(57) ABSTRACT

A method and system of disablement of an exception generating operation of a client system are disclosed. In an embodiment, a method is disclosed in which a snapshot of a client system is acquired. An execution of the client system is recorded, and a system wide exception is intercepted before it causes a client system crash. The execution of the client system is replayed from the snapshot of the client system, and an operation that generates the system wide exception is disabled.

20 Claims, 6 Drawing Sheets

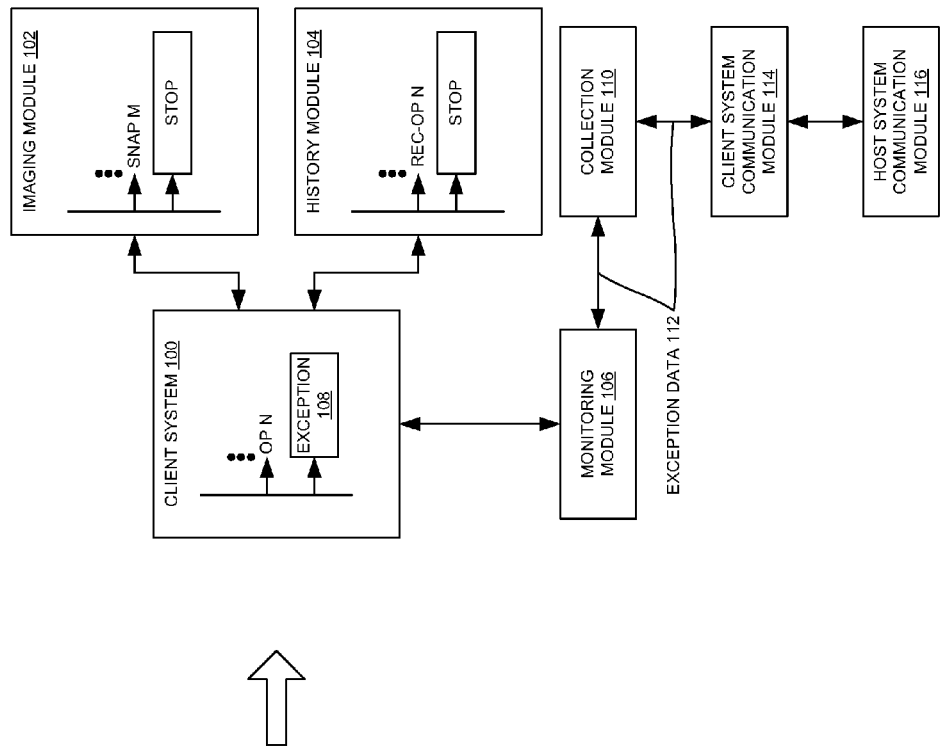
FIGURE 1B: INTERCEPT AND TRANSFER
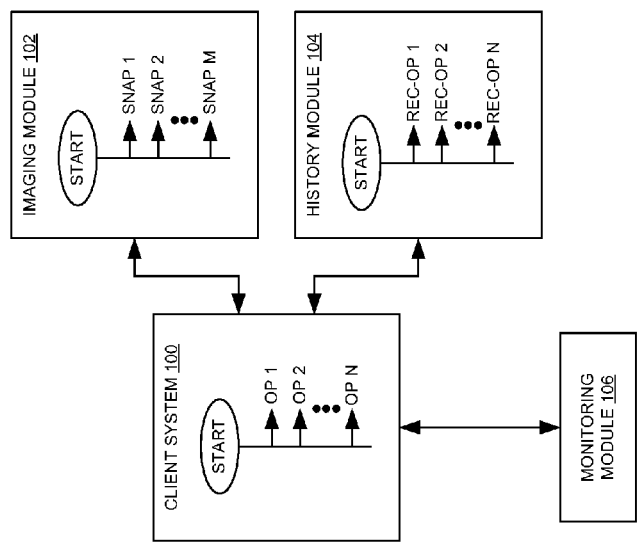
FIGURE 1A: RECORD

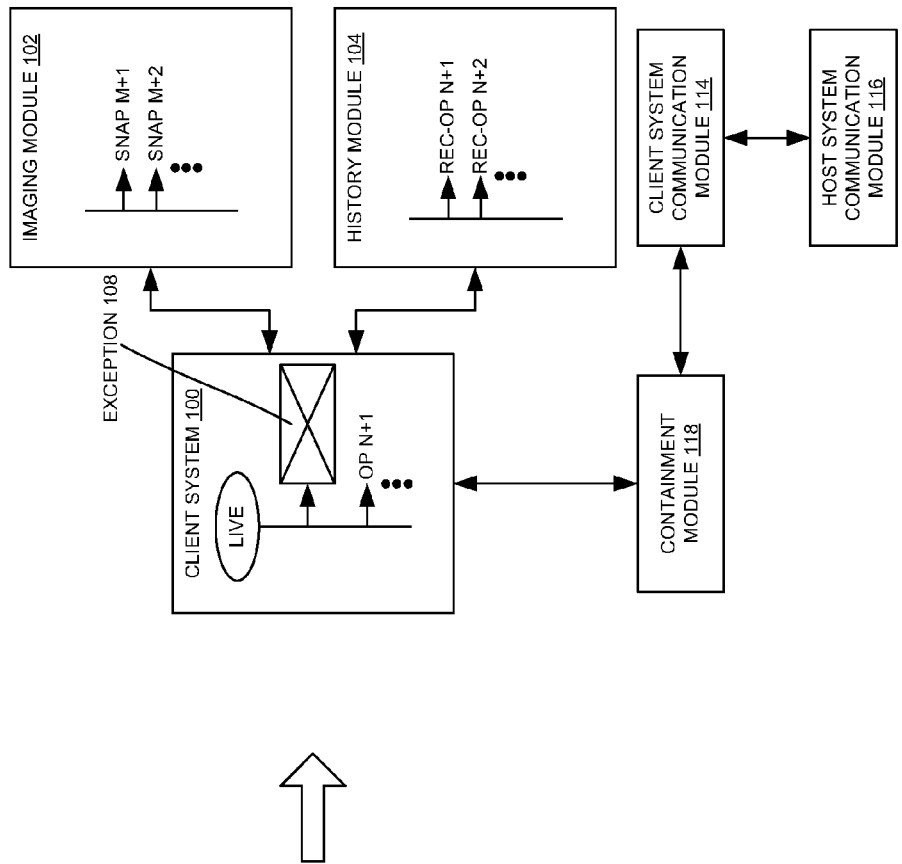
FIGURE 1D: DISABLE
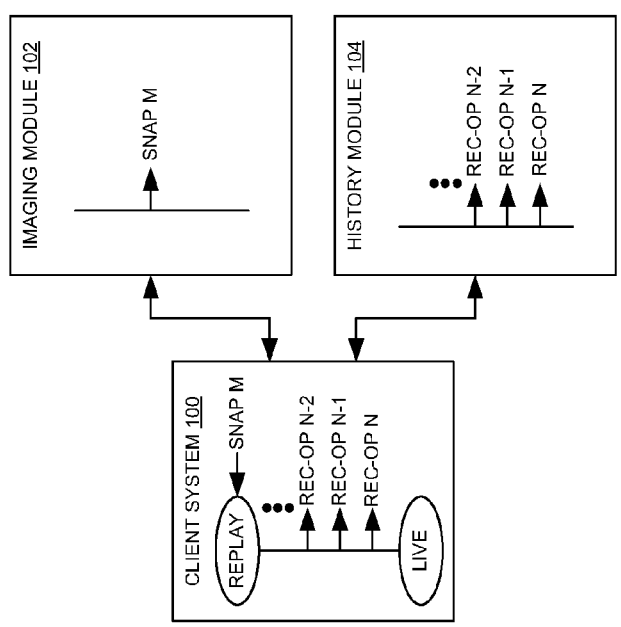
FIGURE 1C: REPLAY AND ACTIVATE

DISABLEMENT OF AN EXCEPTION GENERATING OPERATION OF A CLIENT SYSTEM

FIELD OF TECHNOLOGY

This disclosure relates generally to a technical field of software and/or hardware technology and, in one example embodiment, to disablement of an exception generating operation of a client system.

BACKGROUND

A client system may experience a system wide exception that results in a system crash. The system crash may cause the state of the client system at the time of the crash to be lost. The cause of the crash may not be identified due to nondeterministic causes of the system crash. In addition, a high priority operation running in the client system may be terminated as a result of the system crash. These events may lead to a loss of resources, including processor time, programmer time, and time needed to restore a critical process. The interruption of the high priority operation may further result in a failure to meet a deadline.

SUMMARY

A method and system of disablement of an exception generating operation of a client system are disclosed.

In one aspect, a method is disclosed in which a snapshot of a client system is acquired. The method further includes recording an execution of the client system using a processor and a memory. The method also includes intercepting a system wide exception before it causes a client system crash. In addition, the method includes replaying the execution of the client system is replayed from the snapshot of the client system. The method further includes disabling an operation that generates the system wide exception is disabled.

In another aspect, a system is disclosed. An imaging module of the system acquires a snapshot of a client system. The system further includes a history module that records an execution of the client system using a processor and a memory. The history module also replays the execution of the client system from the snapshot of the client system. A monitoring module of the system intercepts a system wide exception before it causes a client system crash. A containment module of the system disables an operation that generates the system wide exception.

In yet another aspect, a method is disclosed. The method includes acquiring a snapshot of a client system. The client system includes one or more of a guest operating system and a virtual machine. An execution of the client system is recorded using a processor and a memory, and the execution of the client system and the snapshot is recorded on a circular buffer. The method also includes intercepting a system wide exception before it causes a client system crash. The method further includes acquiring an exception data and transferring the exception data to a host system. The method also includes replaying an execution of the client system from the snapshot of the client system. The method also includes activating the client system at a point prior to an occurrence of an operation that generates the system wide exception, and the operation that generates the system wide exception is disabled.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

FIG. 1A is a systematic view illustrating recording an execution of a client system, according to one or more embodiments.

FIG. 1B is a systematic view illustrating interception of an exception in the client system and transfer of an exception data, according to one or more embodiments.

FIG. 1C is a systematic view that illustrates replaying and activating the client system, according to one or more embodiments.

FIG. 1D is a systematic view illustrating disablement of an exception, according to one or more embodiments.

DETAILED DESCRIPTION

Figure 2:
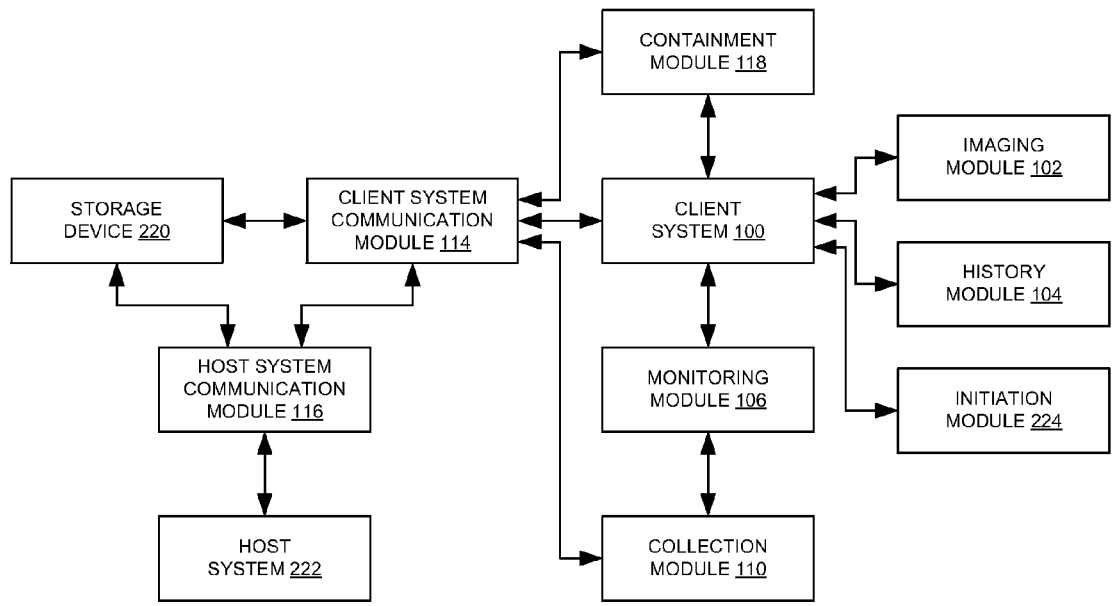
FIG. 2 is a schematic view illustrating the communication between the client system and a host system and a storage device through various modules, according to one or more embodiments.

FIGS. 1A, 1B, 1C, and 1D illustrate a sequence of recording an execution of a client system 100, intercepting an exception 108 and transferring exception data 112, replaying and activating the client system 100, and disabling an exception 108, according to one or more embodiments. Particularly, FIGS. 1A, 1B, 1C, and 1D collectively illustrate the client system 100, an imaging module 102, a history module 104, a monitoring module 106, the exception 108, a collection module 110, the exception data 112, a client system communication module 114, a host system communication module 116, and a containment module 118, according to one or more embodiments.

In an embodiment, the client system 100 processes a series of operations while the imaging module 102 acquires a snapshot of the client system 100. The history module 104 records an execution of the client system 100. The monitoring module 100 intercepts a system wide exception before it causes a client system crash, and the history module 104 replays the execution of the client system 100 from the snapshot of the client system 100. The containment module 118 disables an operation that generates the system wide exception 108. Additional embodiments are described in greater detail below with respect to FIGS. 1A, 1B, 1C, and 1D below.

FIG. 1A is a systematic view illustrating recording an execution of a client system, according to one or more embodiments. Particularly, FIG. 1A illustrates the client system 100, an imaging module 102, a history module 104 and a monitoring module 106, according to one embodiment. In an example embodiment, the client system 100 may be communicatively coupled to the imaging module 102, the history module 104 and the monitoring module 106.

According to one embodiment, the client system 100 (e.g., a thin client, a thick client, a terminal, a virtual machine, etc.) may communicate with and/or access a remote service on a host system (e.g., the host system 222 of FIG. 2, a server, a personal computer, etc.). The client system 100 may be a guest operating system (e.g., of a virtual machine, of a thick client, of a terminal, etc.). The client system 100 may include a virtual machine. When the client system 100 is running, a series of operations (e.g., op 1-N) may be generated in and/or processed using the client system 100.

A snapshot of the client system 100 may be obtained using the imaging module 102, and multiple snapshots may be acquired on a periodic basis at a threshold interval. The snapshot may be a frozen image of the client system 100 at a time 't.' The periodic snapshots (e.g., snap 1-M) of the client system 100 may be acquired using the imaging module 102. The snapshot may be a copy of a set of files and/or directories, a content of a memory byte, and/or a register at a particular time 't.' The snapshot may include the state of a virtual machine at a particular time.

The execution of the operations (e.g., op 1-N) of the client system 100 may be recorded. The history module 104 may record the execution of the operations of the client system 100. For example, the history module 104 may include the recorded operations rec-op 1-N. The execution of the client system 100 may be recorded on a circular buffer, which may use a single, fixed-size buffer as if it is connected end-to-end. The circular buffer may include storage using a non-volatile memory, a volatile memory, and/or magnetic media. The history module 104 may record the execution of the operations of the client system 100 using a processor of a server, a personal computer, and/or a mobile device. The snapshot of the client system 100 may be recorded on the circular buffer and/or an additional buffer.

The monitoring module 106 may observe the operation of the client system 100 and the processes occurring within it for a system wide exception (e.g., the exception 108) that may occur in the client system 100.

FIG. 1B is a systematic view illustrating interception of an exception in the client system and transfer of an exception data, according to one or more embodiments. Particularly, FIG. 1B illustrates the client system 100, the imaging module 102, the history module 104, the monitoring module 106, an exception 108, a collection module 110, an exception data 112, a client system communication module 114 and a host system communication module 116, according to one embodiment.

In an exemplary embodiment, the client system 100 may be communicatively coupled to the imaging module 102, the history module 104 and the monitoring module 106. The monitoring module 106 may be communicatively coupled to the collection module 110. The collection module 110 may communicate with the client system communication module 114. The client system communication module 114 may be communicatively coupled to the host system communication module 116.

According to one embodiment, the client system 100 may execute one or more operations (e.g., op 1-N), during which the imaging module 102 may acquire one or more snapshots of the client system 100. The history module 104 may acquire a recording of the execution of the one or more operations. The recording of the snapshot and the execution of the client system 100 may be stopped when the exception 108 occurs in the client system 100. The exception 108 may include a system wide kernel exception, and an error that may cause a system crash and/or a Blue Screen of Death error message, etc. The exception 108 may be generated in the client system 100 (e.g., within a Guest Operating System) by a kernel module that performs an illegal operation.

In an embodiment, the exception 108 is intercepted before it causes the client system 100 to crash. The exception 108 may be intercepted before a system crash error message (e.g., a Blue Screen of Death error message). For example, the monitoring module 106 may intercept the system wide exception (e.g., the exception 108) before a Blue Screen of Death error message is generated and/or prior to the operation of a client system 100 exception handling process. The monitoring module 106 may inform the history module 104 to stop recording and/or to mark the end of the recording. The monitoring module 106 may inform the imaging module 102 to stop acquiring images of the client system 100. The monitoring module 106 may operate prior to, in conjunction with, and/or in place of the client system's standard exception handling systems. The interception of the exception 108 by the monitoring module 106 may generate a default dump of the exception 108 in a memory that is shared by the client system 100 (e.g., the Guest Operating System) and the host system 222. The dump of the exception 108 may be included in the exception data 112.

The monitoring module 106 may inform the host system communication module 116 that a system crash (e.g., an illegal operation that would generate a Blue Screen of Death error) or an error message caused by the system crash has occurred. The host system communication module 116 may query the monitoring module 106 for exception data 112, which may include a process identification, a thread identification, a guest identification, an exception address, a stack frame information, and/or a time of exception, etc. The time of exception may include a time between the last snapshot and when the exception occurred. The time of exception may include the time an operation that caused the exception 108 was initiated. The exception data 112 may be acquired by the collection module 110.

In an embodiment, the exception data 112 is stored in a memory shared by the client system 100 and a host system (e.g., the host system 222 of FIG. 2). The exception data 112 may be stored by the host system communication module 116. The exception data 112 may be transferred to the host system 222 (e.g., to a module running the host system 222) using the client system communication module 114. The exception data 112 may be transferred using a back door call.

FIG. 1C is a systematic view that illustrates replaying and activating the client system, according to one or more embodiments. Particularly, FIG. 1C illustrates the client system 100, the imaging module 102 and the history module 104, according to one embodiment. In an example embodiment, the client system 100 may be communicatively coupled to the imaging module 102 and the history module 104.

According to one embodiment, the execution of the client system 100 may be replayed from the last snapshot of the client system 100. The last snapshot (e.g., snap M) may be the final complete snapshot obtained before the occurrence of the exception 108. The host system communication module 116 may inform a workstation and/or a virtual machine system module in a host operating system to replay the client system 100 (e.g., using the history module 104 and/or the imaging module 102). The client system 100 may be replayed until the approximate time that an illegal operation is performed that causes the exception 108.

Replaying the execution of the client system 100 may involve acquiring the last snapshot from the imaging module 102 and/or acquiring the execution history of the client system 100 from the history module 104. During the replay operation, the history module 104 and/or the imaging module 102 may provide information to the host system 222 and/or the client system 100 to recreate a state of the client system 100 during a time period immediately prior to the generation of the exception 108. The time period prior to the generation of the exception 108 may include a span of time between an operation prior to the exception 108 generating operation and/or process. The replay operation may involve simulating and/or using the client system 100 to perform the recorded processes necessary to generate a state of the client system 100 prior to the occurrence the exception 108 (e.g., rec-op N−2, rec-op N−1, rec-op N, etc.).

The client system 100 may be activated (e.g., made live, operational, etc.) at a point prior to the occurrence of the operation that generates the exception 108. Activating the client system 100 may allow it to communicate with the host system 222 and/or to receive the exception data 112. The initiation module 224 may activate the client system 100 at a point prior to the occurrence of the operation that generates the exception 108. After the client system 100 is activated, recording of the client system 100 execution by the history module 104 and snapshots by taken by the imaging module 102 may be resumed.

FIG. 1D is a systematic view illustrating disablement of an exception, according to one or more embodiments. Particularly, FIG. 1D illustrates the client system 100, the imaging module 102, the history module 104, the client system communication module 114, the host system communication module 116 and a containment module 118, according to one embodiment.

In an example embodiment, the client system 100 may be communicatively coupled to the imaging module 102, the history module 104, and the containment module 118. The containment module 118 may be communicatively coupled to the client system communication module 114. The client system communication module 114 may communicate with the host system communication module 116.

After the client system 100 is made active, the client system communication module 114 may query the host system communication module for the exception data 112. The exception data 112 may be stored in the storage device 220, which may be shared by the host system 222 and the client system 100. The containment module 118 may use the exception data 112 to identify the process and/or thread that causes the exception 108, and the containment module 118 may disable the process and/or thread. The containment module 118 may use the exception data 112 and a process manager to disable the process and/or thread that cause the exception 108.

After the operation and/or thread that cause the exception 108 is disabled, the operation of the client system 100 may be resumed, during which additional operations (e.g., op N+1, op N+2, etc.) may occur, and recording of the client system 100 operation by the history module 104 and/or the imaging module 102 may be continued.

FIG. 2 is a schematic view illustrating the communication between a system and a host system and a storage device through various modules, according to one or more embodiments. Particularly, FIG. 2 illustrates the client system 100, the imaging module 102, the history module 104, the monitoring module 106, the collection module 110, the client system communication module 114, the storage device 220, the containment module 118, a host communication module 116, the host system 222, and the initiation module 224, according to one embodiment.

In an exemplary embodiment, the client system 100 may be communicatively coupled to the imaging module 102, the history module 104, the containment module 118, the monitoring module 106, the client system communication module 114, and the initiation module 224. The collection module 110 may communicate with the monitoring module 106, and the client system communication module 114. The host system communication module 116 may communicate with the host system 222, the storage device 220 and the client system communication module 114. The storage device 220 may be communicatively coupled to the client system communication module 114. In one embodiment the storage device 220 may be associated with the client system 100 and the host system 222.

Figure 3:
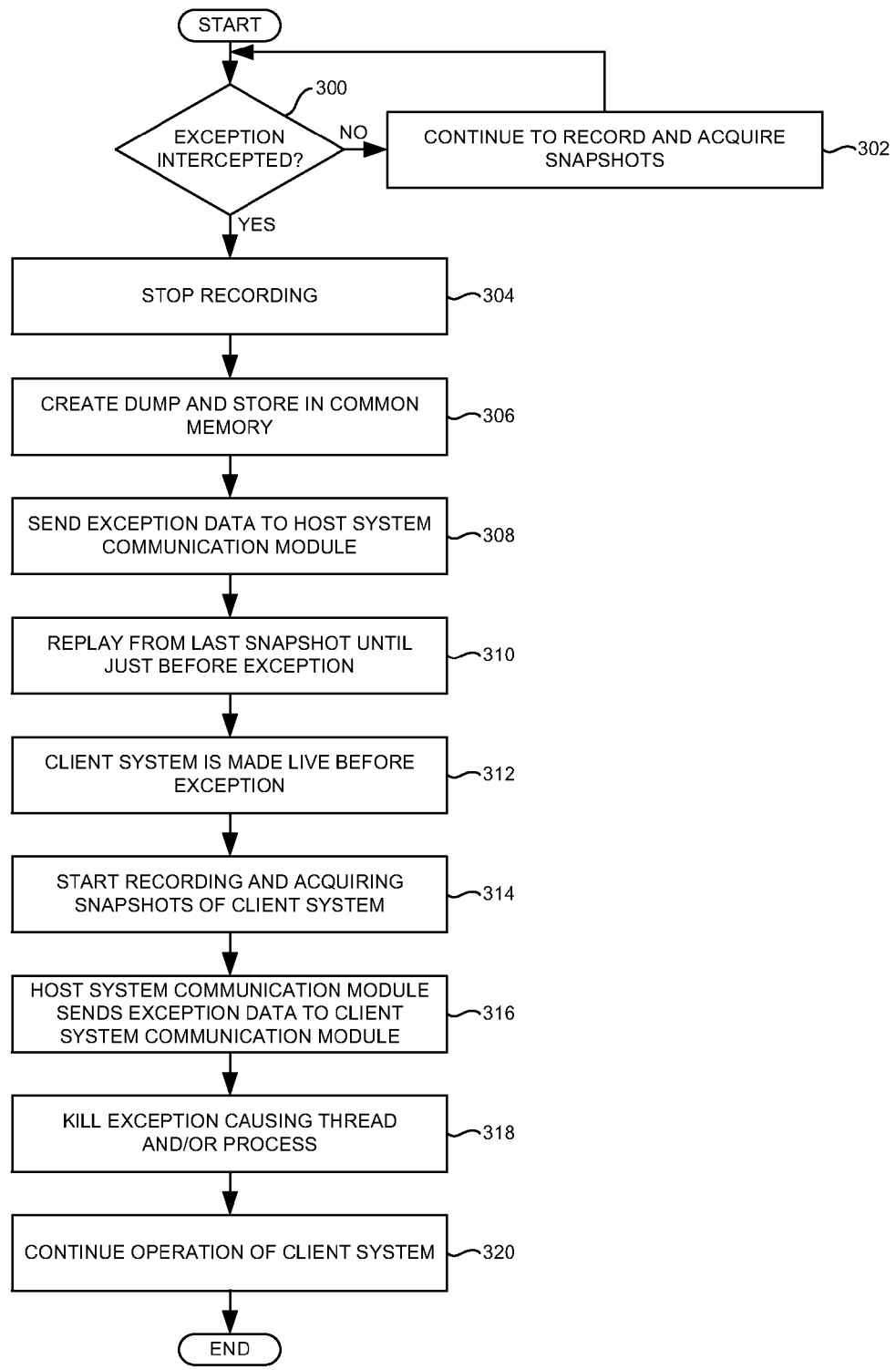
FIG. 3 is a flow chart that illustrates disablement of an exception generating operation in a client system, according to one or more embodiments.

FIG. 3 is a flow chart that illustrates disablement of an exception generating operation in a client system, according to one or more embodiments. In operation 300, whether the exception is intercepted may be determined. For example, the exception 108 may be intercepted by the monitoring module 106. In operation 302, if the exception 108 has not been intercepted, recording and acquisition of snapshots (e.g., of the client system 100 by the history module 104 and the imaging module 102) may continue. In operation 304, if the exception 108 is intercepted, the recording (e.g., of the execution of the client system 100) may be stopped. In operation 306, a dump (e.g., of the exception data 112) may be created and stored in a common memory, which may be the storage device 220. In operation 308, an exception data may be sent to the host system communication module 116. For example, the exception data 112 may be sent to the host system communication module 116 from the client system communication module 114.

In operation 310, the client system 100 may be replayed from the last snapshot (e.g., the snapshot M) until the point prior to of the occurrence of the exception. In operation 312, the client system 100 may be made live (e.g., active, operational, etc.) before an operation that generates an exception 108 is allowed to cause the client system 100 to be crashed. In operation 314, the execution of the client system 100 may be recorded, and snapshots of the state of the client system 100 may be acquired. In operation 316, the host system communication module 116 may send the exception data 112 to the client system communication module 114. In operation 318, a process and/or thread that cause the exception 108 may be killed. In operation 320, operation (e.g., op N+1, op N+2, etc.) of the client system 100 may be continued.

Figure 4:
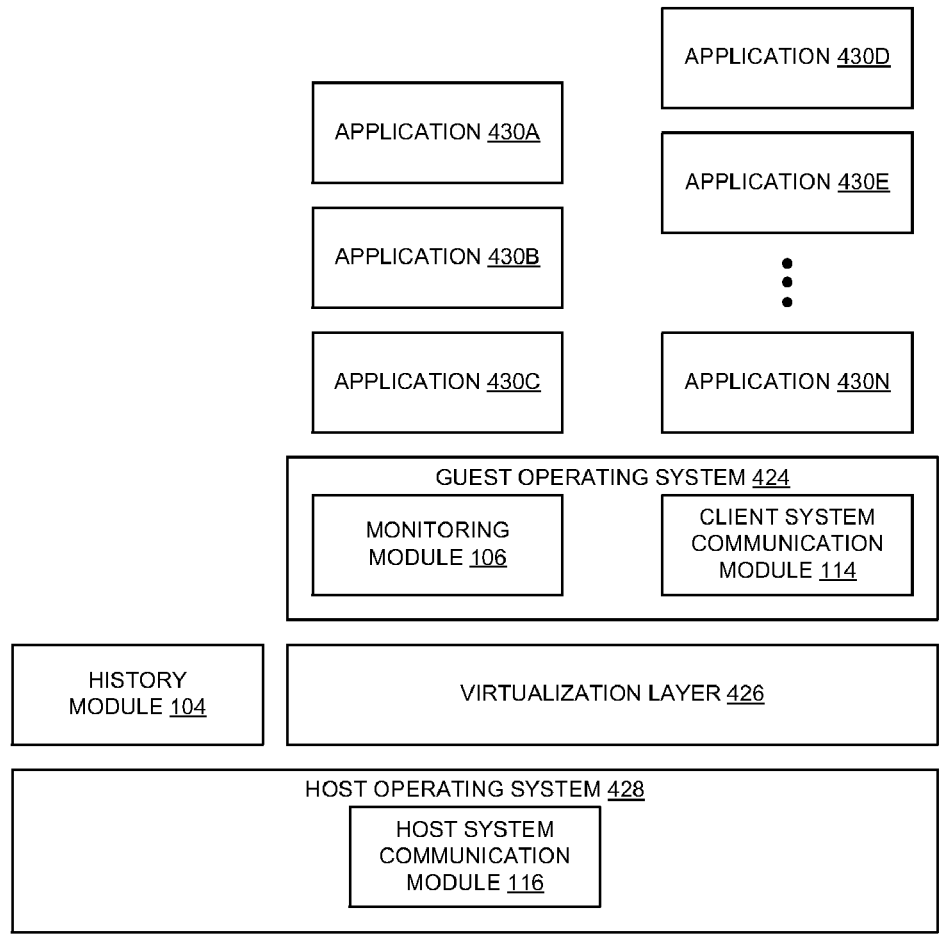
FIG. 4 is a schematic view of that illustrates a guest operating system and a host operating system in a virtual environment, according to one or more embodiments.

FIG. 4 is a schematic view that illustrates a guest operating system and a host operating system in a virtual environment, according to one or more embodiments. Particularly, FIG. 4 illustrates the history module 104, the monitoring module 106, the client system communication module 114, the host system communication module 116, a guest operating system 424, a virtualization layer 426, a host operating system 428 and an application 430A-N, according to one embodiment.

In an example embodiment, the guest operating system 424 may include the monitoring module 106 and the client system communication module 114. The host operating system 428 may include the host system communication module 116. The guest operating system 424 may execute the applications 430A-N. The virtualization layer 426 may provide a virtual environment to the guest operating system 424.

According to one embodiment, the history module 104 may be associated with both the guest operating system 424 and the host operating system 428. The guest operating system 424 may execute the applications 430A-N. The applications 430A-N may be software applications such as word processors, spreadsheets, media players, database applications, etc. The monitoring module 106 of the guest operating system 424 may observe the execution of the guest operating system 424. The monitoring module may intercept the exception 108, and the history module 104 and the imaging module 102 may be instructed to stop recording and acquiring snapshots. The monitoring module 106 may generate a dump file (e.g., exception data 112) when an exception occurs in the guest operating system 424. The dump file may be stored in a memory that is associated with the guest operating system 424 and the host operating system 428. The dump file may include a process identification, a thread identification, an exception address, a stack frame information, a time at which the exception has occurred, etc.

The monitoring module 106 may send the exception data 112 to the host system communication module 116. The host system communication module 116 may receive information (e.g., exception data, etc.) from the guest operating system 424. The host system communication module 116 may transmit a commands and/or information to the guest operating system 424 to perform the required operation. The client system communication module 114 may receive the command from the host system communication module 116 and may perform the required operation.

The guest operating system 424 may replay the execution from the point of last snapshot acquired. The guest operating system 424 may be made live (e.g., active) and recording of the execution of the whole guest operating system 424 may be started once again. The client system communication module 114 may obtain the exception data 112 from the host system communication module 116 and may kill an offending thread and/or process.

Figure 5:
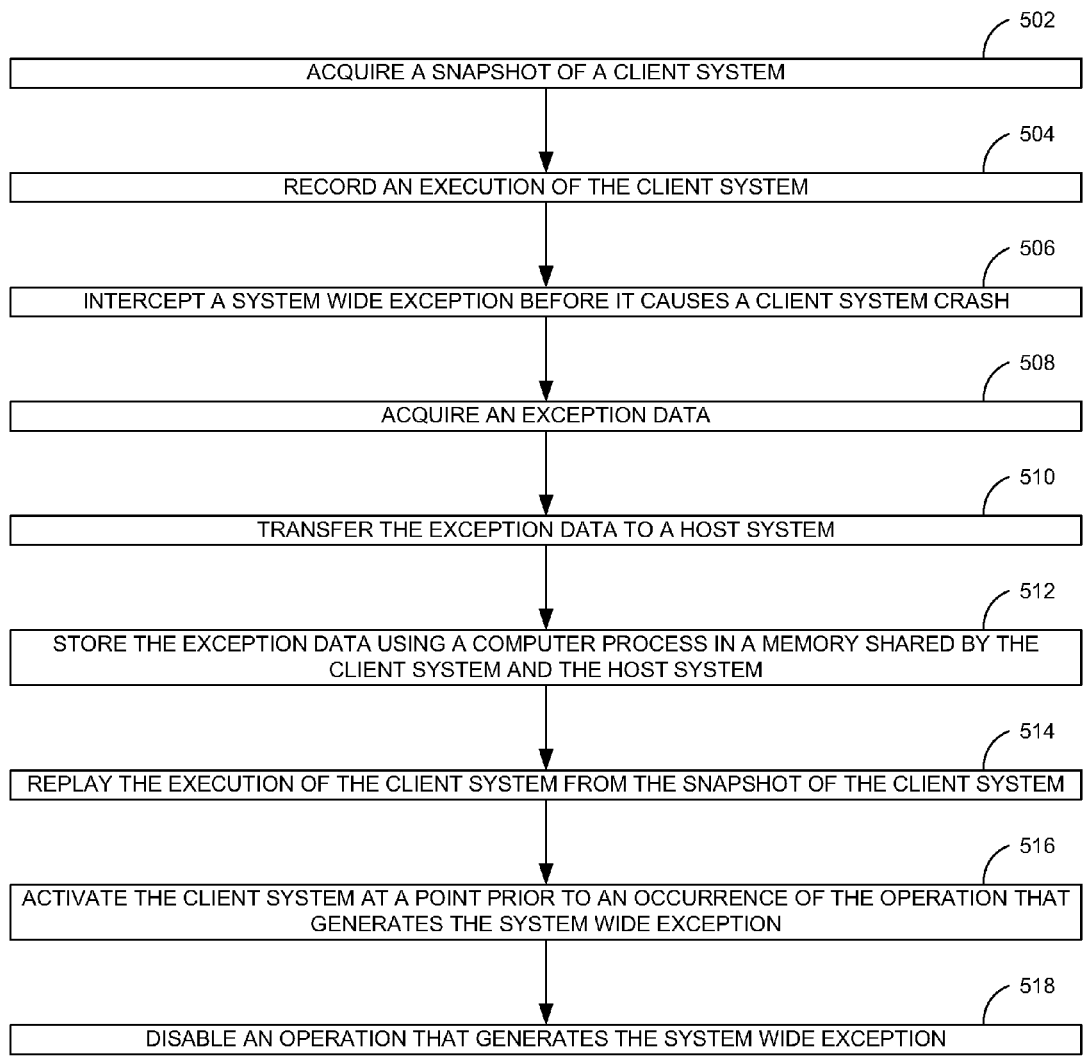
FIG. 5 is a process flow that illustrates intercepting a system wide exception and disabling an operation causing the system wide exception, according to one or more embodiments.

FIG. 5 is a process flow that illustrates intercepting a system wide exception and disabling an operation causing the system wide exception, according to one or more embodiments. In operation 502, a snapshot of a client system (e.g., the client system 100 of FIG. 1) may be acquired. For example, the imaging module 102 of FIG. 1 may acquire a snapshot of the client system 100. The snapshot may be an image of a state of the client system 100. The client system 100 may include a guest operating system (e.g., the guest operating system 424 of FIG. 4). The client system 100 may also include a virtual machine. In operation 504, an execution of the client system 100 may be recorded. For example, the history module 104 of FIG. 1 may record an execution of the client system 100. The execution of the client system 100 may be recorded on a circular buffer.

In operation 506, a system wide exception may be intercepted before it causes the client system 100 crash. For example, the monitoring module 106 of FIG. 1 may intercept a system wide exception before it causes the client system 100 crash. In operation 608, an exception data (e.g., the exception data 112 of FIG. 1) may be acquired. For example, the collection module 110 of FIG. 1 may acquire the exception data 112. The exception data 112 may include one or more of a process identification, a guest identification, an exception address, a stack frame information, and a time of exception.

In operation 510, the exception data 112 may be transferred to a host system (e.g., the host system 222 of FIG. 1). For example, the client system communication module 114 of FIG. 1 may transfer the exception data 112 to the host system 222. The exception data 112 may be transferred using a back door call. In operation 512, the exception data 112 may be stored using a computer process in a memory (e.g., the storage device 220) shared by the client system 100 and the host system 222.

In operation 514, the execution of the client system 100 may be replayed from the snapshot of the client system 100. For example, the history module 104 may replay the execution of the client system 100 from the snapshot of the client system 100. The snapshot of the client system 100 may be recorded on an additional circular buffer. In operation 516, the client system 100 may be activated (e.g., using an initiation module 224) at a point prior to an occurrence of the operation that generates the system wide exception.

In operation 518, an operation that generates the system wide exception may be disabled. For example, the containment module 118 may disable an operation that generates the system wide exception. The exception data 112 may be used to disable the operation that generates the system wide exception.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the imaging module 102, the history module 104, the monitoring module 106, the collection module 110, the client system communication module 114, the host system communication module 116, the containment module 118, the initiation module 224, and other modules may be enabled using software and/or using transistors, logic gates, and electrical circuits (e.g., application specific integrated ASIC circuitry) such as an imaging circuit, a history circuit, a monitoring circuit, a collection circuit, a client system communication circuit, a host system communication circuit, a containment circuit and other circuits.

In one or more embodiments, programming instructions for executing the above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention may be useful machine operations. One or more embodiments of the invention also relate to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While one or more embodiments of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What is claimed is:

1. A method, comprising:
    acquiring a snapshot of a client system;
    recording an execution of the client system using a processor and a memory;
    intercepting a system wide exception before it causes a client system crash;
    replaying the execution of the client system from the snapshot of the client system; and
    disabling an operation that generates the system wide exception.

2. The method of claim 1, wherein the client system is comprised of a guest operating system.

3. The method of claim 1, wherein the client system is comprised of a virtual machine.

4. The method of claim 1, further comprising activating the client system at a point prior to an occurrence of the operation that generates the system wide exception.

5. The method of claim 1, wherein the execution of the client system is recorded on a circular buffer.

6. The method of claim 5, wherein the snapshot of the client system is recorded on an additional circular buffer.

7. The method of claim 1, further comprising:
    acquiring an exception data; and
    transferring the exception data to a host system.

8. The method of claim 7, wherein the exception data is transferred using a back door call.

9. The method of claim 7, wherein the exception data is comprised of at least one of a process identification, a thread identification, a guest identification, an exception address, a stack frame information, and a time of exception.

10. The method of claim 7, further comprising storing the exception data using a computer process in a memory shared by the client system and the host system.

11. The method of claim 7, wherein the exception data is used to disable the operation that generates the system wide exception.

12. The method of claim 1, wherein a machine is caused to perform the method of claim 1 when a set of instructions in a form of a machine-readable medium is executed by the machine.

13. A computer system, comprising:
    a processor and memory, the processor executing computer programming instructions from computer program modules, the computer program modules comprising:
        an imaging module to acquire a snapshot of a client system;
        a history module to record an execution of the client system using the processor and the memory and to replay the execution of the client system from the snapshot of the client system;
        a monitoring module to intercept a system wide exception before it causes a client system crash; and
        a containment module to disable an operation that generates the system wide exception.

14. The system of claim 13, wherein the client system is comprised of a guest operating system.

15. The system of claim 13, wherein the client system is comprised of a virtual machine.

16. The system of claim 13, further comprising an initiation module to activate the client system at a point prior to an occurrence of the operation that generates the system wide exception.

17. The system of claim 13, wherein at least one of the execution of the client system and the snapshot of the client system is recorded on a circular buffer.

18. The system of claim 13, further comprising:
    a collection module to acquire an exception data; and
    a client system communication module to transfer the exception data to a host system.

19. A non-transitory computer readable storage media to store programming instructions, comprising:
    programming instructions for acquiring a snapshot of a client system, wherein the client system is comprised of at least one of a guest operating system and a virtual machine;
    programming instructions for recording an execution of the client system using a processor and a memory, wherein the execution of the client system and the snapshot is recorded on a circular buffer;

programming instructions for intercepting a system wide exception before it causes a client system crash;
programming instructions for acquiring an exception data;
programming instructions for transferring the exception data to a host system;
programming instructions for replaying the execution of the client system from the snapshot of the client system;
programming instructions for activating the client system at a point prior to an occurrence of an operation that generates the system wide exception; and
programming instructions for disabling the operation that generates the system wide exception.

20. The non-transitory computer readable storage media of claim 19, further comprising programming instructions for storing the exception data using a computer process in a memory shared by the client system and the host system, wherein the exception data is transferred through a bypass communication route, wherein the exception data is comprised of at least one of a process identification, a thread identification, a guest identification, an exception address, a stack frame information, and a time of exception, and wherein the exception data is used to disable the operation that generates the system wide exception.

* * * * *